3,037,612
PORTABLE ELEVATOR

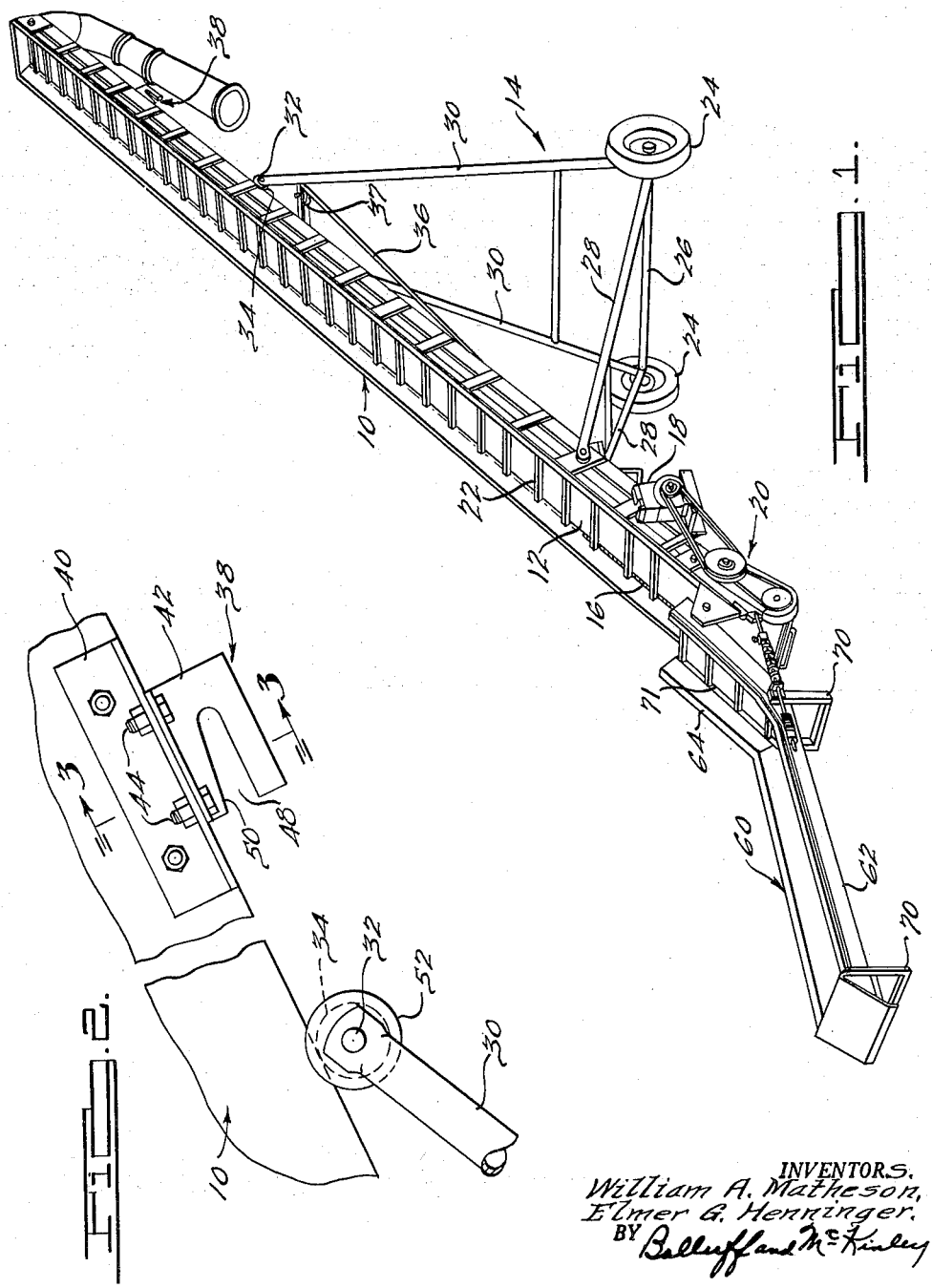

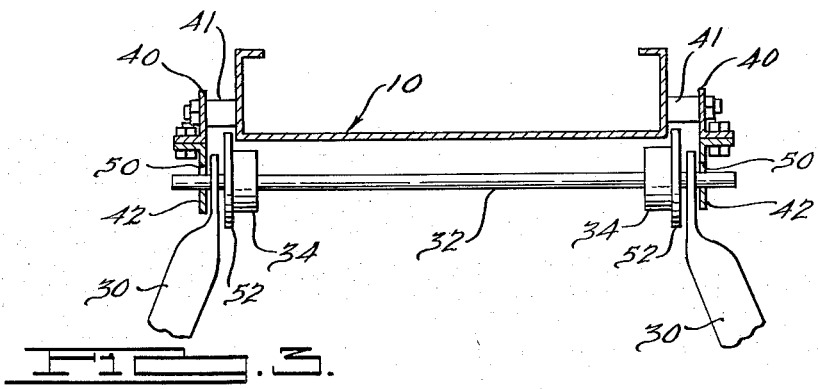
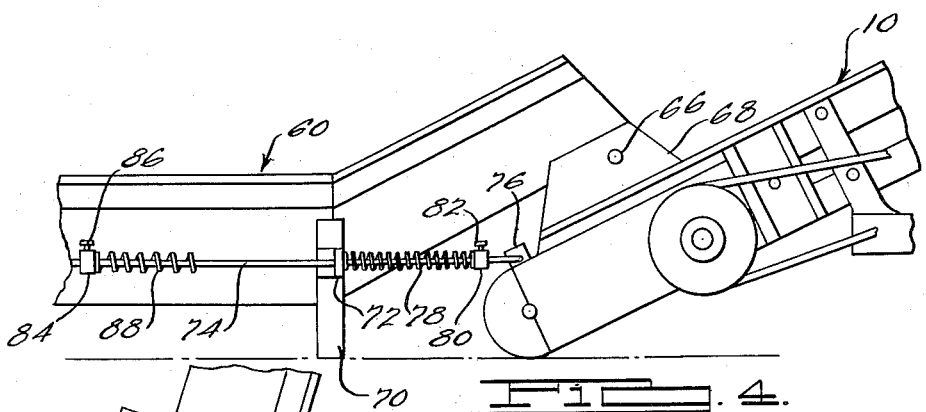
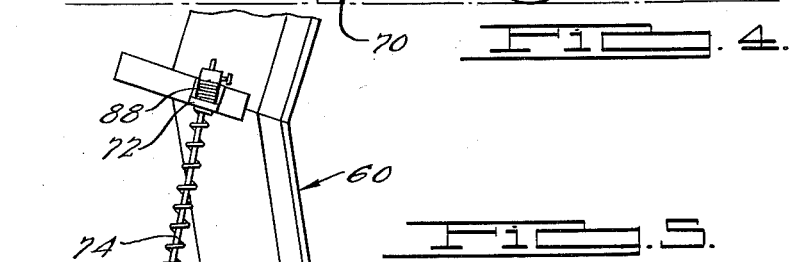
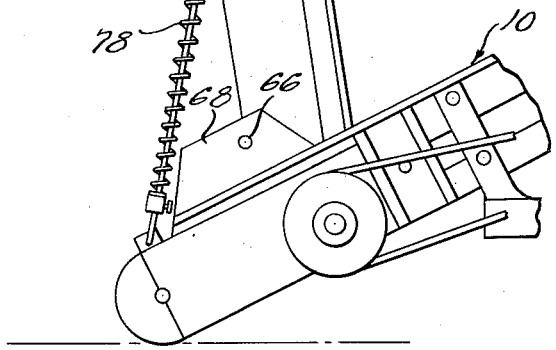

William A. Matheson and Elmer G. Henninger, Bloomington, Ill., assignors to Portable Elevator Mfg. Co., Bloomington, Ill., a corporation of Illinois
Filed Sept. 7, 1960, Ser. No. 54,517
6 Claims. (Cl. 198—120.5)

This invention relates to farm equipment and particularly to a portable elevator of the kind employed for handling various crops and other farm products. A portable elevator of this nature in general consists of an elongated chute provided with a power driven conveyor by means of which the products being handled can be conveyed from a truck or wagon into a silo or barn. The elevator is supported on a two-wheeled carriage by means of a reach consisting of a pair of arms pivotally connected to the carriage and to the chute adjacent its lower end and a boom comprising a second pair of arms also pivoted to the carriage and provided with rollers at their outer ends which travel along the underside of the chute to a selected position to provide the desired degree of elevation of the upper end of the chute. The angular position of the boom is generally controlled by a cable extending between the reach and boom and operated by a winch.

It is frequently necessary to transport an elevator of this type by means of a tractor or other vehicle, and it is desirable to transport the chute in a substantially horizontal balanced position, which is achieved by lowering the boom until the rollers reach a predetermined position toward the end of the chute. One feature of the present invention is the provision of a new and improved transport arrangement for a portable elevator which provides a positive stop for the rollers relative to the chute in the transport position of the chute and which also automatically lifts the chute off of the rollers as the transport position is reached. This arrangement is very advantageous in that it prevents the chute from bouncing on the rollers during transport, which would result in denting of the bottom of the chute, with consequent interference with proper raising and lowering of the chute and possible interference with or damage to the chain conveyor.

Another feature of the invention is in the provision of a new and improved mounting arrangement for a feeder chute of the kind which is frequently used in conjunction with a portable elevator of the type described. The feeder generally consists of a length of chute pivotally connected to the lower end of the elevator chute and from wich the material being handled is fed to the elevator chute. According to the present invention, counterbalancing springs are employed to assist in raising the feeder chute and, in addition, a stop mechanism is employed to limit elevation of the feeder chute. The stop mechanism also includes springs which assist the operator in initiating movement of the feeder chute from its elevated to its lowered position. In the present construction, the raising spring and stop arrangement is such that there is no obstruction to the feeder chute or the elevator chute.

A principal object of the invention therefore is to provide a portable elevator of the type described having a new and improved means for supporting the same in a substantially balanced position on a transport derrick.

A further object of the invention is to provide a new and improved arrangement for mounting a feeder chute on a portable elevator of the type described.

Other and further objects of the invention will be apparent from the following description and claims and may be understood by reference to the accompanying drawings, of which there are two sheets, which by way of illustration show a preferred embodiment of the invention and what we now consider to be the best mode of applying the principles thereof. Other embodiments of the invention may be used without departing from the scope of the present invention as set forth in the appended claims.

In the drawings:

FIG. 1 is a perspective view of a portable elevator and feeder chute constructed according to the present invention;

FIG. 2 is a side elevational view of the stop and hold-down arrangement for the transport position of the elevator chute;

FIG. 3 is a sectional view taken on the line 3—3 of FIG. 2, with the chute in its transport position;

FIG. 4 is a side elevational view of the mounting arrangement for the feeder chute and showing the latter in its lowered position; and FIG. 5 is a view similar to FIG. 4 showing the feeder chute in its elevated position.

A portable elevator of the type in question may comprise an elongated chute 10 having a bottom wall 12 and opposed side walls defining an upwardly open trough or chute which is supported on a derrick indicated generally at 14. A conveyor is disposed within the chute 10 and consists of chains 16 at each side of the chute passing over sprockets at the opposite ends of the chute, the sprocket at the lower end constituting a drive sprocket driven from a small gasoline engine 18 through a suitable speed reducer 20. The conveyor includes blades 22 connected to chains 16 and adapted to travel along the bottom of the chute for elevating the material being handled from the lower end of the chute to the upper end as the conveyor is driven in the manner described.

The derrick 14 comprises a pair of wheels 24 mounted on an axle 26. A reach comprising a pair of supporting arms 28 is pivotally connected at its lower end to the axle 26 and at its upper end to the opposite sides of the chute 10. A boom comprising a second pair of supporting arms 30 is pivoted at its lower end to the axle 26. An axle 32 connects the upper ends of the arms 30 and has rollers 34 thereon which engage the underside of the chute 10. The angularity of the boom is controlled by a cable 36 passed around pulleys 37 supported on the boom and operated by a winch to cause the rollers 34 to travel along the underside of the chute 10 to elevate the upper end of the chute as desired. The elevator construction and supporting derrick thus far described is more or less conventional and further details thereof and of the conveyor arrangement are not illustrated herein.

When the elevator chute 10 is to be transported from one location to another, it is lowered until it reaches a stop indicated generally at 38 in which the chute is maintained in a more or less horizontal position. This is accomplished by letting out the cable 36 so that the rollers 34 travel toward the outer end of the chute until the stop 38 is reached. With conventional arrangements, the chute is always supported on the rollers 34 even while being transported, with the result that the chute will bounce on the rollers thereby causing denting or other damage to the underside of the chute. FIGURES 2 and 3 illustrate the combined stop and hold-down 38 for the transport position of the chute. Brackets 40 are secured to the opposite sides of the chute adjacent the outer end thereof and spaced from the sides of the chute by spacers 41. The stop and hold-down member 38 consists of an inverted L-shaped bracket 42 secured by bolts 44 to each of the brackets 40 with the vertical portions of the brackets 42 lying in the vertical planes of the projecting ends of the axle 32. Each of the brackets 42 is provided with a slot 48 opening from the edge thereof facing the lower end of the chute. The upper edges 50 of the slots 48 are slightly inclined relative to the underside of the chute 10 so that, as the rollers 34 reach the outer end of the chute, the ends of the axle 32 will be received within the slots 48 and the inclined edges 50 will provide a cam action which lifts the chute slightly off of the rollers 34 so that the weight of the chute is taken by the axle 32. The rollers 34 are provided with flanges 52 which, as shown in FIG. 3, extend slightly above the bottom wall of the chute 10 to prevent lateral displacement of the outer end of the chute from the rollers 34. When the ends of the axle 32 reach the inner ends of the slots 48 in the brackets 42, the chute will be lifted off of the rollers 34 but the flanges 52 on the rollers will still project above the bottom surface of the chute to confine the chute between the flanges 52. The chute is firmly held down by the engagement of the axle 32 and the brackets 42, the weight of the chute holding the axle firmly against the ends of the slots 48. The position of the brackets may be adjusted along the length of the chute to provide the proper transport position for the chute.

A feeder chute such as that indicated at 60 is frequently used with a portable elevator of the type described for conveying the material being handled into the elevator chute. The feeder comprises a chute having bottom and side walls, including a relatively long horizontal section 62 and a relatively short inclined section 64. The upper end of the section 64 is pivoted by means of a shaft 66 on brackets 68 secured on the opposite sides of the chute 10 at its lower end. Supporting legs 70 are adapted to support the chute with the section 62 thereof in a generally horizontal position above the ground. The feeder chute may be provided with a chain conveyor 71 driven with the elevator conveyor in a suitable manner.

A bracket 72 is secured on each side of the feeder chute 60 and is provided with an aperture through which a rod 74 slidably extends. The rods 74 are pivoted at their inner ends on lugs 76 secured on the opposite sides of the elevator chute 10 at its lower end. Raising springs 78 surround the rods 74 and are confined between the brackets 72 and collars 80 which are secured on the rods 74 by means of set screws 82. The position of the collars 80 on the rods 74 may be adjusted to regulate the compression of the springs 78. The springs 78 are substantially completely compressed when the feeder chute is in its horizontal position, and these springs therefore assist the operator in raising the feeder chute to its elevated position. The springs 78 are only slightly compressed when the feeder chute is in its elevated position shown in FIG. 5. The springs are compressed as the chute is lowered so as to cushion the chute as it reaches its lowered position. It will be apparent that the springs 78 could engage the lugs 76 on the elevator chute rather than the collars 80.

Each of the rods 74 is provided with a stop collar 84 on its outer end secured thereto by a set screw 86 so that the position of the collars 84 may be adjusted as required. A spring 88 surrounds each of the rods 74 between its stop collar 84 and bracket 72. As the feeder chute 60 is raised to its elevated position, the springs 88 are compressed between the brackets 72 and the stop collars 84, thereby providing a stop for the elevated position of the chute 60. Since the springs 88 are compressed when the chute 60 is raised, these springs assist the operator in initiating movement of the chute back to its lowered position. The chute 60 due to its length is relatively heavy and when raised is in an overcenter position relative to its pivot axis 66. The springs 88 therefore assist the operator in lowering the chute until the chute can fall of its own weight, whereupon the springs 78 cushion the lowering of the chute. With this arrangement it is possible to have both the raising springs and the stop mechanism arranged along the sides of the feeder chute, thereby eliminating any obstruction either to the feeder chute or the elevator chute.

While we have illustrated and described a preferred embodiment of our invention, it is understood that this is capable of modification, and we therefore do not wish to be limited to the precise details set forth but desire to avail ourselves of such changes and alterations as fall within the purview of the following claims.

We claim:

1. In a portable elevator including an elongated chute and a supporting derrick having a pair of support arms pivoted at their lower ends to a wheeled carriage and provided at their upper ends with rollers engaging and movable along the underside of the chute for adjusting the angle of inclination of the chute in accordance with the position of the rollers along the underside of the chute; the improvement comprising an axle connecting the upper ends of said support arms and on which said rollers are mounted, brackets on opposite sides of said chute each having a slot therein open toward the lower end of said chute, said slots being adapted to receive and engage said axle as said rollers travel outwardly along said chute to a position in which the chute is substantially horizontal for transport thereof on said wheeled carriage, the ends of said slots defining a stop for limiting travel of said rollers outwardly along said chute, the edges of said slots being inclined relative to the underside of said chute so that the engagement of said axle with said edges of said slots lifts said chute off of said rollers whereby the weight of said chute is borne by said axle when said chute is in said transport position.

2. In a portable elevator including an elongated chute and a supporting derrick having a boom pivoted at its lower end to a wheeled carriage and provided at its upper end with a roller engaging and movable along the underside of the chute for adjusting the angle of inclination of the chute in accordance with the inclination of said boom, an axle on which said roller is mounted, a bracket on said chute having a slot therein open toward the lower end of said chute, said slot being adapted to receive said axle as said roller travels outwardly along said chute to a position in which the chute is substantially horizontal for transport thereof on said wheeled carriage, the end of said slot defining a stop for limiting travel of said roller outwardly along said chute, the edge of said slot being inclined relative to the underside of said chute so that the engagement of said axle with said edge of said slot lifts said chute off of said roller whereby the weight of said chute is borne by said axle when said chute is in said transport position.

3. In a portable elevator including an elongated chute and a supporting derrick having a boom pivoted at its lower end to a wheeled carriage and provided at its upper end with rollers engaging and movable along the underside of the chute for adjusting the angle of inclination of the chute in accordance with the inclination of said boom; the improvement comprising an axle on which said rollers are mounted, brackets on opposite sides of said chute each having a slot therein open toward the lower end of said chute, said slots being adapted to receive and engage said axle to define a stop for limiting travel of said rollers outwardly along said chute, the edges of said slots being inclined relative to the underside of said chute so that the engagement of said axle with said edges of said slots lifts said chute off of said rollers whereby the weight of said chute is borne by said axle when said axle is engaged in said slots.

4. A portable elevator according to claim 3 wherein said rollers are provided with flanges engageable with the sides of said chute for confining said chute against lateral displacement from said rollers when said chute is supported on said axle.

5. In a portable elevator including an elongated chute and a supporting derrick having a boom pivoted at its lower end to a wheeled carriage and provided at its upper end with roller means engaging and movable along the underside of the chute for adjusting the angle of inclination of the chute in accordance with the inclination of said boom, an axle on which said roller means is mounted, a stop member on said chute adapted to be engaged by said axle as said roller means travels outwardly along said chute to define a position in which the chute is adapted for transport on said wheeled carriage, said stop member having a cam surface thereon inclined relative to the underside of said chute so that the engagement of said axle with said cam surface lifts said chute off of said roller means whereby the weight of said chute is borne by said axle when said chute is in said transport position.

6. A portable elevator according to claim 5 wherein said stop member includes a portion engageable with the underside of said axle to prevent said chute from lifting off of said axle during transport.

References Cited in the file of this patent

UNITED STATES PATENTS

| | | |
|---|---|---|
| 2,195,567 | Glidden et al. | Apr. 2, 1940 |
| 2,577,328 | Hyman | Dec. 4, 1951 |
| 2,606,648 | Smoker | Aug. 12, 1952 |
| 2,773,586 | Schmidtke | Dec. 11, 1956 |